United States Patent
Sharifi et al.

(10) Patent No.: US 10,878,318 B2
(45) Date of Patent: Dec. 29, 2020

(54) ADAPTIVE ARTIFICIAL NEURAL NETWORK SELECTION TECHNIQUES

(71) Applicant: Google LLC, Mountain View, CA (US)

(72) Inventors: Matthew Sharifi, Kilchberg (CH); Jakob Nicolaus Foerster, Zürich (CH)

(73) Assignee: Google LLC, Mountain View, CA (US)

( * ) Notice: Subject to any disclaimer, the term of this patent is extended or adjusted under 35 U.S.C. 154(b) by 823 days.

(21) Appl. No.: 15/082,653

(22) Filed: Mar. 28, 2016

(65) Prior Publication Data
US 2017/0277994 A1 Sep. 28, 2017

(51) Int. Cl.
*G06N 3/08* (2006.01)
*H04L 29/06* (2006.01)
(Continued)

(52) U.S. Cl.
CPC ............. *G06N 3/08* (2013.01); *G06F 9/505* (2013.01); *G06F 9/5044* (2013.01);
(Continued)

(58) Field of Classification Search
CPC ...... G06F 9/5044; G06F 9/505; G06F 9/5094; G06N 3/0454; G06N 3/08; H04L 67/42; Y02D 10/22
See application file for complete search history.

(56) References Cited

U.S. PATENT DOCUMENTS 5,509,103 A * 4/1996 Wang .................. G06K 9/6287
704/232
5,586,215 A 12/1996 Stork et al.
(Continued)

FOREIGN PATENT DOCUMENTS

| JP | 2010218307 | 9/2010 |
|---|---|---|
| JP | 2011108087 | 6/2011 |
| WO | WO 2013/024597 | 3/2019 |

OTHER PUBLICATIONS

Hwang, Inchul, Design and Implementation of Cloud Offloading Framework among Devices for Web Applications, 12th Annual IEEE Consumer Communications and Networking Conference (CCNC), 41-46 (Year: 2015).*

(Continued)

*Primary Examiner* — Kamran Afshar
*Assistant Examiner* — Marshall L Werner
(74) *Attorney, Agent, or Firm* — Oblon, McClelland, Maier & Neustadt, L.L.P.

(57) ABSTRACT

Computer-implemented techniques can include obtaining, by a client computing device, a digital media item and a request for a processing task on the digital item and determining a set of operating parameters based on (i) available computing resources at the client computing device and (ii) a condition of a network. Based on the set of operating parameters, the client computing device or a server computing device can select one of a plurality of artificial neural networks (ANNs), each ANN defining which portions of the processing task are to be performed by the client and server computing devices. The client and server computing devices can coordinate processing of the processing task according to the selected ANN. The client computing device can also obtain final processing results corresponding to a final evaluation of the processing task and generate an output based on the final processing results.

19 Claims, 3 Drawing Sheets

(51) Int. Cl.
  *G06F 9/50* (2006.01)
  *G06N 3/04* (2006.01)
(52) U.S. Cl.
  CPC ......... *G06F 9/5094* (2013.01); *G06N 3/0454* (2013.01); *H04L 67/42* (2013.01); *Y02D 10/00* (2018.01)

(56) References Cited

U.S. PATENT DOCUMENTS

| | | | |
|---|---|---|---|
| 5,712,922 | A | 1/1998 | Loewenthal et al. |
| 6,633,846 | B1 | 10/2003 | Bennett et al. |
| 7,089,178 | B2 | 8/2006 | Garudadri et al. |
| 8,463,025 | B2 | 6/2013 | Melvin et al. |
| 2005/0129306 | A1* | 6/2005 | Wang ............... G06T 3/403 382/156 |
| 2013/0114849 | A1 | 5/2013 | Pengelly et al. |
| 2013/0231947 | A1* | 9/2013 | Shusterman ....... G06F 19/3418 705/2 |
| 2014/0067738 | A1 | 3/2014 | Kingsbury |
| 2015/0193694 | A1 | 7/2015 | Vasseur et al. |
| 2015/0310290 | A1 | 10/2015 | Cuthbert et al. |
| 2015/0364128 | A1* | 12/2015 | Zhao ................. G06N 3/0445 704/259 |
| 2016/0034811 | A1* | 2/2016 | Paulik ............... G06N 3/0454 706/20 |
| 2016/0328644 | A1* | 11/2016 | Lin .................... G06N 3/084 |
| 2016/0364419 | A1* | 12/2016 | Stanton ............. G06N 3/08 |
| 2017/0011281 | A1* | 1/2017 | Dijkman ............ G06K 9/66 |
| 2017/0062010 | A1* | 3/2017 | Pappu ................ G10L 15/265 |
| 2017/0076195 | A1* | 3/2017 | Yang ................. G06N 3/0454 |
| 2017/0169358 | A1* | 6/2017 | Choi ................. G06F 16/9535 |

OTHER PUBLICATIONS

Lane, Nicholas et al., Can Deep Learning Revolutionize Mobile Sensing?, HotMobile '15 Proceedings of the 16th International Workshop on Mobile Computing Systems and Applications, 117-122 (Year: 2015).*

Eom, Heungsik et al., Machine Learning-based Runtime Scheduler for Mobile Offloading Framework, IEEE/ACM 6th International Conference on Utility and Cloud Computing, 17-25 (Year: 2013).*

Gember, Aaron et al., ECOS: Leveraging Software-Defined Networks to Support Mobile Application Offloading, 2012 ACM/IEEE Symposium on Architectures for Networking and Communications Systems (ANCS), 199-210 (Year: 2012).*

Shi, Cong et al., COSMOS: Computation Offloading as a Service for Mobile Devices, MobiHoc '14 Proceedings of the 15th ACM international symposium on Mobile ad hoc networking and computing (Year: 2014).*

Shi, Bowen et al., Offloading Guidelines for Augmented Reality Applications on Wearable Devices, MM '15 Proceedings of the 23rd ACM international conference on Multimedia, 1271-1274 (Year: 2015).*

Hauswald, J. et al., A Hybrid Approach to Offloading Mobile Image Classification, 2014 IEEE International Conference on Acoustic, Speech and Signal Processing (ICASSP), 8375-8379 (Year: 2014).*

Rallapalli, S. et al., Are Very Deep Neural Networks Feasible on Mobile Devices?, Mar. 18, 2016. (Year: 2016).*

Hauswald, J. et al., A Hybrid Approach to Offloading Mobile Image Classification, 2014 IEEE International Conference on Acoustic, Speech and Signal Processing (ICASSP), p. 8375-8379, 2014. (Year: 2014).*

Shi, Bowen et al., Offloading Guidelines for Augmented Reality Applications on Wearable Devices, MM '15 Proceedings of the 23rd ACM international conference on Multimedia, p. 1271-1274, 2015. (Year: 2015).*

Hwang, Inchul, Design and Implementation of Cloud Offloading Framework among Devices for Web Applications, 12th Annual IEEE Consumer Communications and Networking Conference (CCNC), p. 41-46, 2015. (Year: 2015).*

Lane, Nicholas et al., Can Deep Learning Revolutionize Mobile Sensing?, HotMobile '15 Proceedings of the 16th International Workshop on Mobile Computing Systems and Applications, p. 117-122, 2015. (Year: 2015).*

Eom, Heungsik et al., Machine Learning-based Runtime Scheduler for Mobile Offloading Framework, IEEE/ACM 6th International Conference on Utility and Cloud Computing, p. 17-25, 2013. (Year: 2013).*

Dean et al., Large Scale Distribution Deep Networks, Advances in Neural Information Processing Systems 25 (NIPS 2012), 2012. (Year: 2012).*

Pierobon, Gabriel, Visualizing intermediate activation in Convolutional Neural Networks with KEras, Nov. 2018. (Year: 2018).*

Gember, Aaron et al., ECOS: Leveraging Software-Defined Networks to Support Mobile Application Offloading, 2012 ACM/IEEE Symposium on Architectures for Networking and Communications Systems (ANCS), p. 199-210, 2010. (Year: 2010).*

Shi, Cong et al., COSMOS: Computation Offloading as a Service for Mobile Devices, MobiHoc '14 Proceedings of the 15th ACM international symposium on Mobile ad hoc networking and computing, 2014. (Year: 2014).*

Chun et al., CloneCloud: Elastic Execution between Mobile Device and Cloud,EuroSys'11 pp. 181-194, Apr. 2011. (Year: 2011).*

Hauswald, J. et al., A Hybrid Approach to Offloading Mobile Image Classification, 2014 IEEE International Conference on Acoustic, Speech and Signal Processing (ICASSP), pp. 8375-8379, 2014. (Year: 2014).*

Cuervo et al., MAUI: Making Smartphones Last Longer with Code Offload, MobiSys'10, pp. 49-62, Jun. 2010. (Year: 2010).*

Shen et al., MCDNN: An Execution Framework for Deep Neural Networks on Resource Constrained Devices, pp. 1-17, Dec. 2014. (Year: 2014).*

Written Opinion issued in International Application No. PCT/US2016/067715, dated Feb. 19, 2018, 7 pages.

Hsueh, M., "Interactive Text Recognition and Translation on a Mobile Device," Electrical Engineering and Computer Sciences, University of California at Berkeley, Technical Report No. UCB/EECS-2011-57, May 13, 2011, http://www.eecs.berkeley.edu/Pubs/TechRpts/2011/EECS-2011-57.html, 13 pages.

PCT International Search Report and Written Opinion dated Mar. 9, 2017 for PCT International Application No. PCT/US2016/067715, 13 pages.

JP Notice of Allowance in Japanese Appln. No. PCT/US2016/067715, dated Sep. 17, 2019, 5 pages (with English translation).

Ichinose et al., "Examination for the destributed processing of deep learning framework Caffe," DEIM Forum 2016 D1-3, 11 pages (with English translation).

* cited by examiner

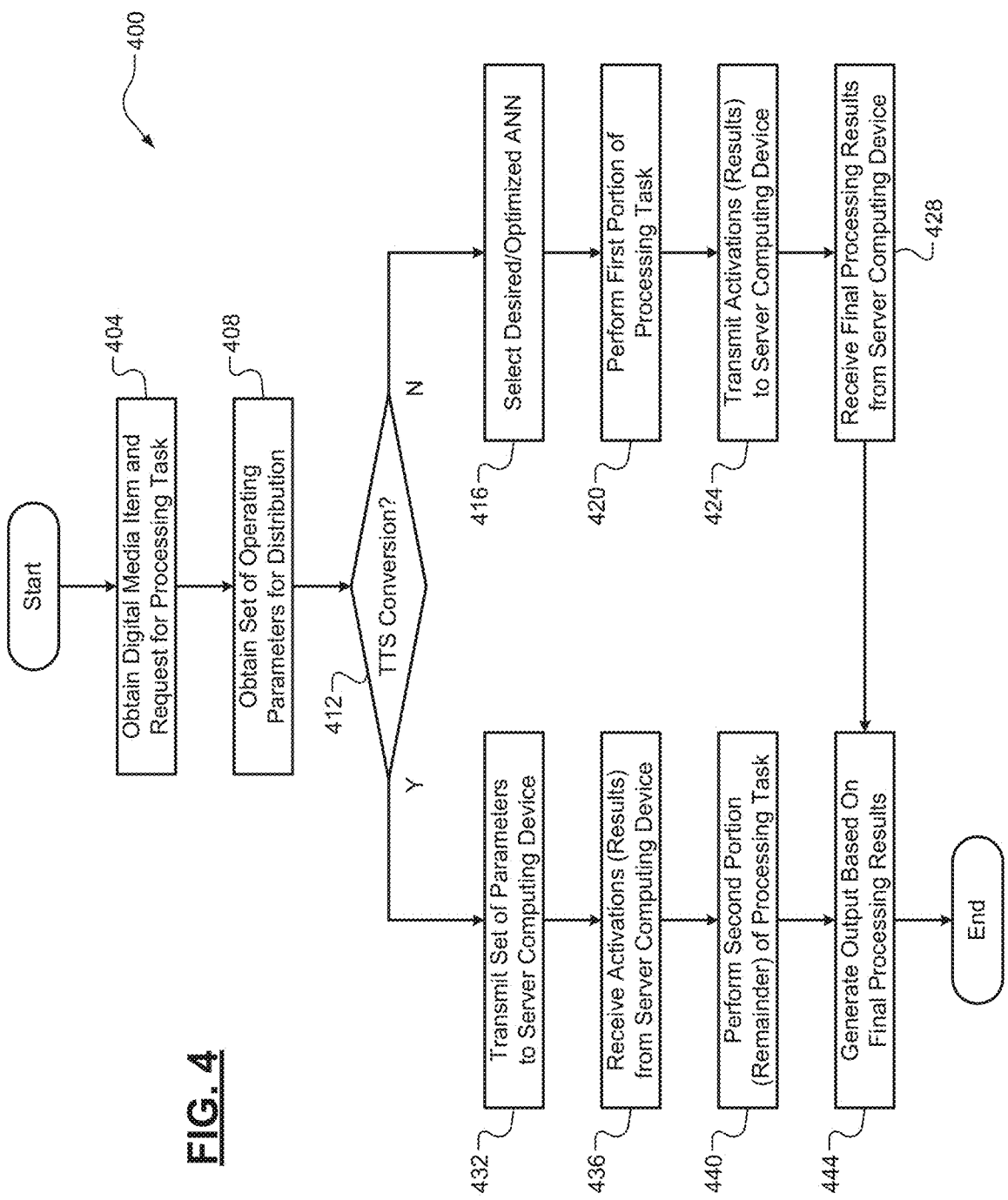

ADAPTIVE ARTIFICIAL NEURAL NETWORK SELECTION TECHNIQUES

FIELD

The present disclosure relates to distributed client-server processing and, more particularly, to adaptive artificial neural network (ANN) selection techniques.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A client computing device (e.g., a mobile phone) can communicate with a remote server computing device that is configured to perform at least a portion of a processing task. The degree of processing to be performed at the server computing device can depend on a variety of factors. One example factor is a quality or strength of a network connection between the client and server computing devices. When the network connection has a low quality/strength, the client computing device may handle a greater amount of the processing task. For certain intensive processing tasks (e.g., machine learning models), however, the server computing device may be far more capable and thus much preferred to handle certain portions of the processing task. The client computing device, therefore, may apply a compression to any data to be transferred to the server computing device. This compression, however, can cause data loss, which can negatively affect the end results of the processing task.

SUMMARY

A computer-implemented technique and a computing system having one or more processors and a non-transitory memory storing a set of executable instructions for the technique are presented. The technique can include obtaining, by a client computing device having one or more processors, a digital media item and a request for a processing task on the digital item, determining, by the client computing device, a set of operating parameters based on (i) available computing resources at the client computing device and (ii) a condition of a network, wherein the client computing device and a server computing device are configured for communication with each other via the network, based on the set of operating parameters, selecting one of a plurality of artificial neural networks (ANNs), each ANN defining which portions of the processing task are to be performed by the client and server computing devices, coordinating, between the client and server computing devices, processing of the processing task according to the selected ANN, obtaining, by the client computing device, final processing results corresponding a final evaluation of the processing task; and generating, by the client computing device, an output based on the final processing results.

In some embodiments, each ANN defines first and second portions of the processing task, the first portion to be performed (i) by one of the client and server computing devices prior to (ii) communication via the network that causes the other of the client and server computing devices to perform the second portion. In some embodiments, the client computing device (i) selects the selected ANN, (ii) performs the first portion of the processing task to obtain the intermediate processing results, (iii) transmits, to the server computing device, the intermediate processing results, and (iv) receives, from the server computing device via the network, the final processing results.

In some embodiments, the available computing resources at the client computing device includes at least one of (i) a level of charge of a battery of the client computing device, (ii) a level of processing power of the client computing device. In some embodiments, the available computing resources at the client computing device includes both (i) a level of charge of a battery of the client computing device, (ii) a level of processing power of the client computing device. In some embodiments, the digital media item is an audio file or a video file, and the processing task is speech recognition or speech-to-text. In other embodiments, the digital media item is an image file or a video file, and the processing task is image recognition or text recognition. In other embodiments, the digital media item is a string of text or a text file, and wherein the processing task is text-to-speech.

In some embodiments, the technique further includes: transmitting, from the client computing device and to the server computing device, the set of operating parameters, wherein receipt of the set of operating parameters causes the server computing device to (i) select the selected ANN and (ii) perform the first portion of the processing task to obtain intermediate processing results, and receiving, by the client computing device and from the server computing device via the network, the intermediate processing results. In some embodiments, the client computing device performs the second portion of the processing task using the intermediate processing results to obtain the final processing results.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a flow diagram of an example adaptive ANN selection technique according to some implementations of the present disclosure.

DETAILED DESCRIPTION

As previously mentioned, a client computing device (e.g., a mobile phone) may apply compression to data that is to be transmitted to a remote server computing device for at least a portion of a processing task. High levels of compression can cause data loss, which can negatively affect the results of the processing performed by the server computing device. Open-ended speech recognition, for example, is a processing task that is computationally expensive and the best accuracy can be achieved by performing recognition server-side. As a result, one limiting factor in the widespread uptake of speech recognition-related features is the associated network bandwidth and latency requirements.

Artificial neural networks (ANNs) involve deep learning to obtain large machine learning models, which are typically implemented at server computing devices. Examples of processing tasks performed by ANNs include speech recognition (e.g., speech-to-text or transcription), image recognition, text recognition (e.g., optical character recognition, or OCR), and text-to-speech transformation. While ANNs have produced vast improvements in models, which has led to great quality improvements, it has not reduced the roundtrip latency and battery impact due to data transmitted over the network. At least some portions of these processing tasks, however, can be performed locally by the client computing devices.

Accordingly, adaptive ANN selection techniques are presented. The techniques involve a client computing device obtaining a digital media item (text, audio, image, video, etc.) and a request for a processing task on the digital media item. The client computing device can obtain a set of operating parameters (battery level, processing power, network speed, etc.) that affect a distribution of the processing task between the client computing device and a server computing device. Depending on the processing task, one of the client and server computing devices can select one of a plurality of ANNs each defining a distribution of the processing task. According to the selected ANN, the client and server computing devices can perform portions of the processing task and the final evaluation can be output at the client computing device.

Figure 1:
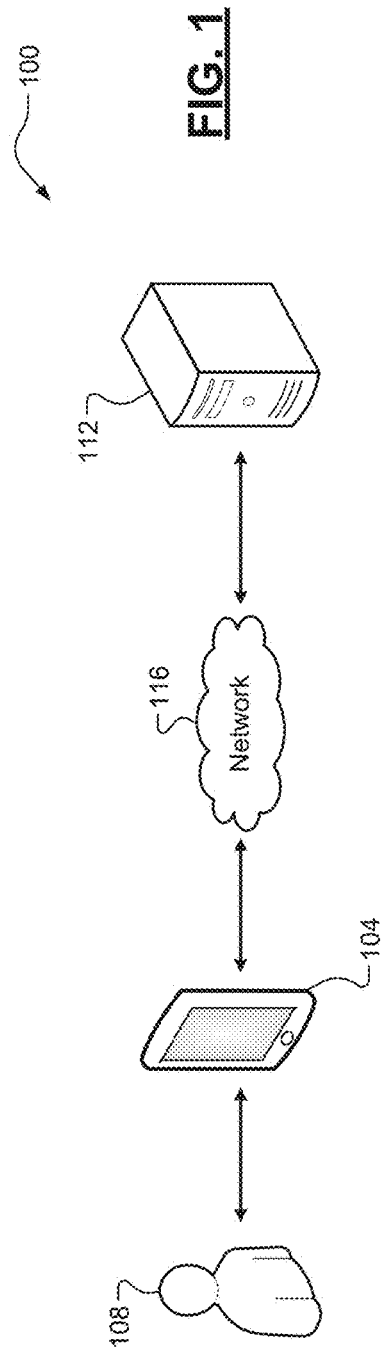
FIG. 1 is a diagram of an example computing system according to some implementations of the present disclosure.

Referring now to FIG. 1, a diagram of an example computing system 100 according to some implementations of the present disclosure is illustrated. The computing system 100 can include a client computing device 104 associated with a user 108. The client computing device 104 can be any suitable computing device (a desktop computer, a laptop computer, a tablet computer, a mobile phone, etc.). The client computing device 104 can communicate with a server computing device 112 via a network 116. The network 116 can be a local area network (LAN), a wide area network (WAN), e.g., the Internet, or a combination thereof. The term "server computing device" as used herein can refer to both a single server computing device and two or more server computing devices operating in a parallel or distributed architecture. For example, a machine learning model may be distributed over a plurality of server computing devices.

Figure 2:
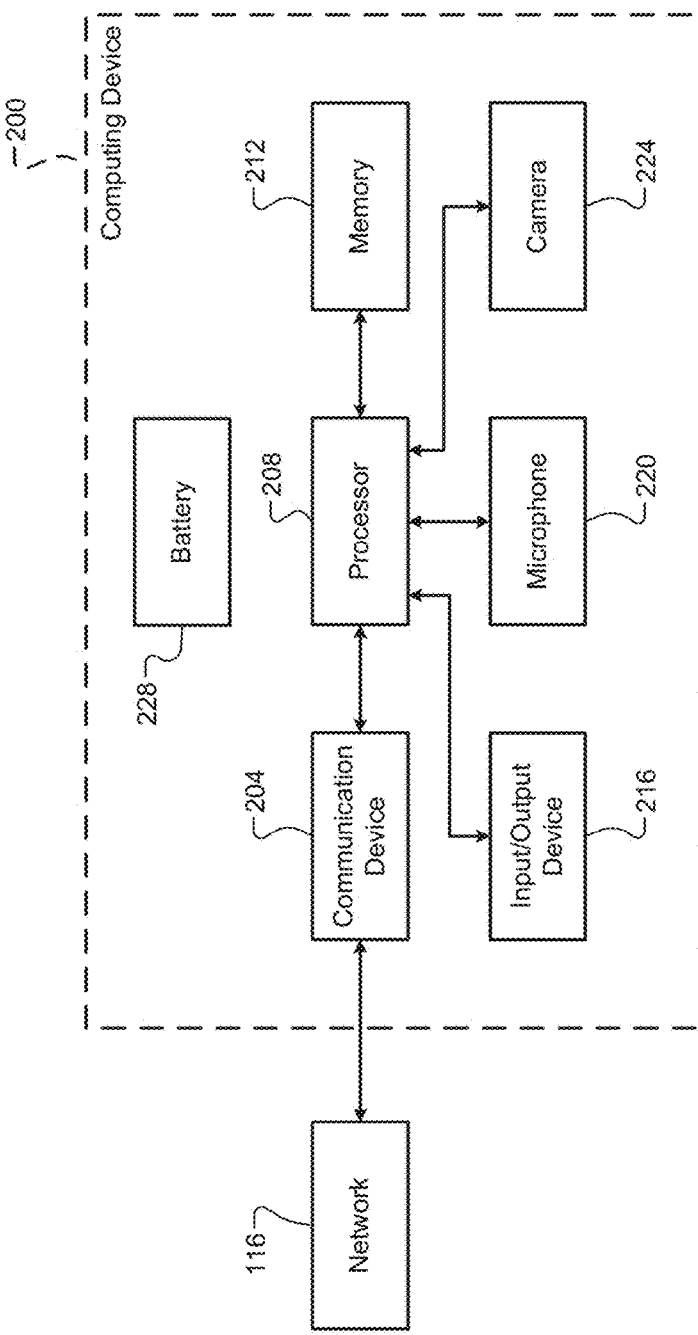
FIG. 2 is a functional block diagram of an example computing device of FIG. 1.

Referring now to FIG. 2, an example computing device 200 is illustrated. In one implementation, the computing device 200 can include a communication device 204, a processor 208, a memory 212, an input/output device 216, a microphone 220, and a camera 224. For purposes of this disclosure, the computing device 200 can represent the client computing device 104 and/or the server computing device 112. It will be appreciated, however, that these devices 104, 112 may have a slightly different configuration (e.g., the server computing device 112 may not include the input/output device 216, the microphone 220, and the camera 224). The communication device 204 can be any suitable device (e.g., a transceiver) configured for communication via the network 116. The memory 212 can be any suitable storage medium (flash, hard disk, etc.) configured to store information at the computing device 200, such as a set of instructions for execution by the processor 208.

The term "processor" as used herein can refer to both a single processor and two or more processors operating in a parallel or distributed architecture. When executed by the processor 208, the set of instructions can cause the computing device 200 to perform at least a portion of the techniques of the present disclosure. The input/output device 216 can be a touch display, a physical keyboard/buttons, a speaker, or some combination thereof. The microphone 220 can be any suitable device configured to capture audio data (e.g., an audio stream). The camera 224 can be any suitable device (e.g., a charge-coupled device, or CCD) configured to capture image/video data (e.g., a static image or a video stream). The computing device 200 can also include a battery 228 for powering its operation (e.g., for mobile computing devices). As mentioned above, the computing device 200 can be configured to perform at least a portion of the techniques of the present disclosure, which are now discussed in greater detail.

Referring again to FIG. 1 and with continued reference to FIG. 2, the client computing device 104 can obtain a digital media item and a request for a processing task. The digital media item may be obtained by the user 108 operating the client computing device 104 (audio captured by the microphone 220, text obtained via the input/output device 216, image/video captured by the camera 224, etc.). The digital media item may also be captured by another computing device and subsequently obtained by the client computing device 104. Non-limiting examples of the digital media item include a string of text or an entire text file, an image file, an audio file, and a video file. Non-limiting examples of the processing task include speech recognition (e.g., speech-to-text or transcription), text recognition (e.g., OCR), image recognition, and text-to-speech conversion.

The terms "artificial neural network" and "ANN" as used herein can refer to a machine learned model or family of models that is/are split across the client and server computing devices 104, 112. Each machine learned model can be trained, for example, using similar data as a processing task performed using the machine learned model. For example, acoustic data can be utilized in training a machine learned acoustic model. Each ANN can be described as being divided into different layers. Each layer can represent a task or a set of tasks to be performed by one of the client and server computing devices 104, 112. The results of each task or set of tasks can then be passed on to a subsequent layer, and so on and so forth. A final layer can then output a final evaluation, which can also be referred to as the final processing results. A bottleneck layer can represent a layer that causes the transmission of information (e.g., activations) from one device to the other (e.g., from the client computing device 104 to the server computing device 112). In other words, the bottleneck layer can represent the conclusion of a device's assigned layers, and the activations can include the results of the portion of the processing task completed by the initial device, as well as additional information for completing the processing task at the other device.

The task can be described as training the ANNs such that they work optimally from both a quality point of view, while also balancing other objectives. For example, one other objective can be to limit client-side computation to what is feasible on the device. This may be determined, for example, by how many pre-bottleneck layers there are and the size of each layer, which corresponds to increased computation costs. Another example objective can be to limit the amount of communication/network cost and latency. This may be determined, for example, by the number of nodes and the amount of information (level of fidelity) in the bottleneck layer. The other device (e.g., the server computing device 112) can receive the bottleneck layer, which can include activations that cause the device to perform a remainder of the layers and thus obtain the final evaluation. The final evaluation may then be returned to the initial device (e.g., the client computing device 104) for generating an output. Examples ANNs and their respective layers are discussed in greater detail below and illustrated in FIGS. 3A-3C.

The client computing device 104 can determine a set of operating parameters, which can be used in the selection of one of a plurality of ANNs for performing the processing task. Each operating parameter can affect and thus can be indicative of a desired distribution of the processing task between the client computing device 104 and the server computing device 112. As previously discussed, the server computing device 112 may be better equipped to handle extensive processing, but network conditions can affect the feasibility of the server computing device 112 being able to handle all or a majority of the processing task, for example, due to the high dimensionality of the input. Non-limiting examples of the operating parameters include (i) available computing resources at the client computing device 104 (a level of charge of the battery 228, a level of processing power (e.g., a type of the processor 208), etc.), and (ii) a condition of a connection via the network 116 between the client and server computing devices 104, 112 (hereinafter, "network connection").

A lower level of charge of the battery 228, for example, can be indicative of a desire to perform a smaller portion of the processing task at the client computing device 104. Similarly, a lower level of processing power of the client computing device 104 can be indicative of a desire to perform a smaller portion of the processing task at the client computing device 104. The condition of the network condition, on the other hand, may be a more important factor on the desired distribution of the processing task. More particularly, a faster network connection can be indicative of a desire for the server computing device 112 to perform as much of the processing task as feasible. Similarly, a slower network connection can be indicative of a desire for the client computing device 104 to handle at least some of the processing task. While network speed is discussed, other network connection conditions (bandwidth, data cost, etc.) can also affect the desired distribution. Another example factor, for example, is a load on the server computing device 112 (e.g., heavy network traffic) and in these cases the client computing device 104 could handle a larger portion of the processing task.

As previously mentioned, based on the set of operating parameters, one of the plurality of ANNs can be selected. Each ANN can define which portions of the processing task are to be performed by the client and server computing devices 104, 112. By training the plurality of different ANNs and by having the relevant layers for client and server available on both sides (client and server), the techniques disclosed herein can provide for dynamic selection of compression level, latency, and computational cost. Depending on the processing task, either the client computing device 104 or the server computing device 112 can select the ANN to obtain the selected ANN that is utilized in the distributed processing of the processing task. By using the bottleneck layer activations as a compressed representation, data can be compressed in a way that is most effective for the recognition task. Further, lossless or lossy compression may be applied over the coefficients themselves to further reduce the query payload.

Figure 3C:
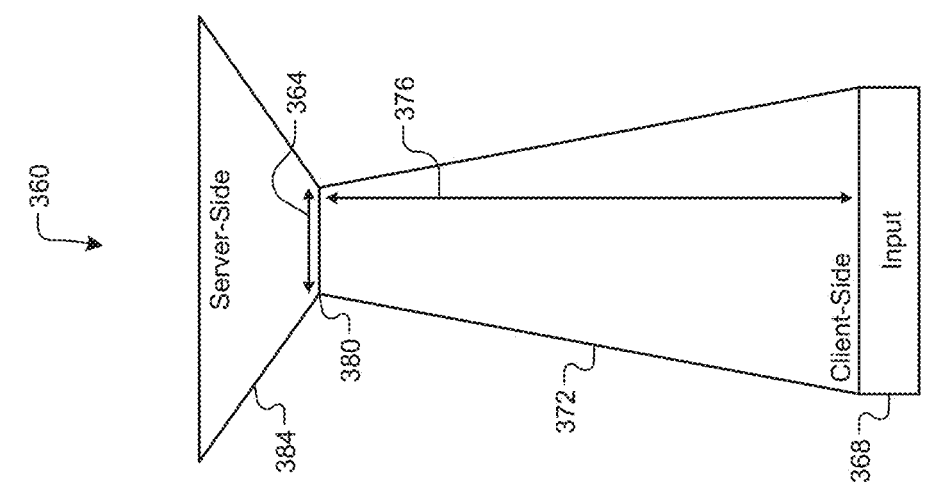
FIGS. 3A-3C are diagrams of various artificial neural network (ANN) configurations of server-side layers, client-side layers, and a bottleneck layer, according to some implementations of the present disclosure.
Figure 3B:
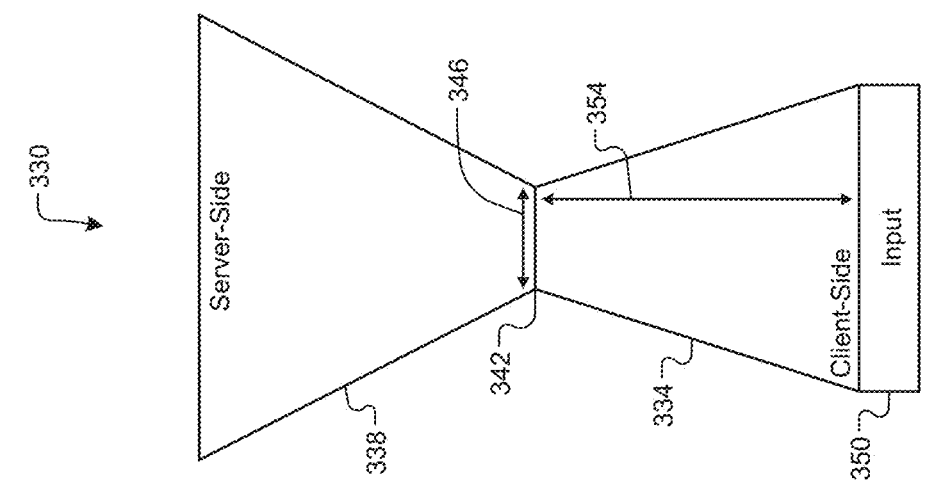
Figure 3A:
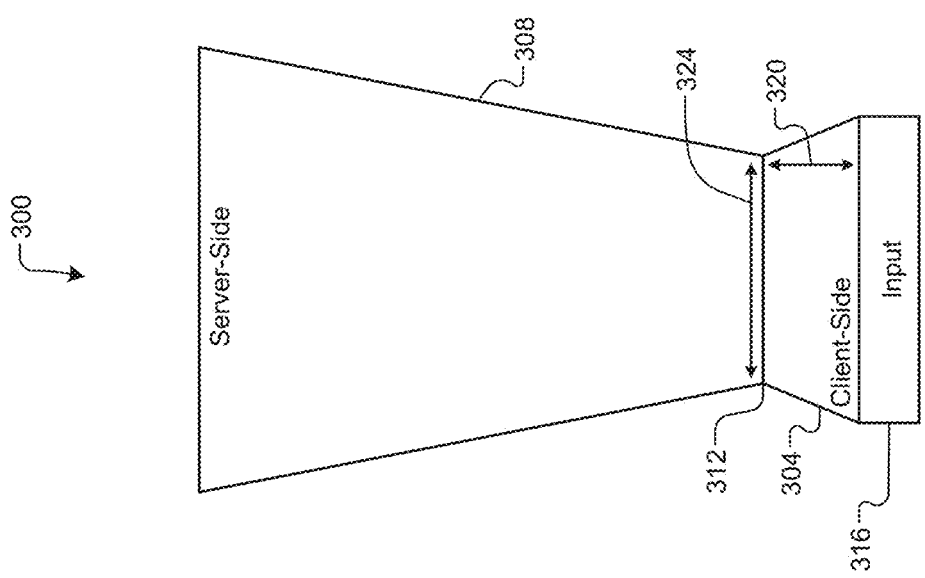

In one exemplary implementation, there can be three different ANNs, which are illustrated in FIGS. 3A-3C and described below. While three ANNs are shown and described herein, it will be appreciated that any plurality of ANNs (two ANNs, four or more ANNs, etc.) could be trained and selected from. Each ANN can illustrate two degrees of freedom: (1) a number of pre-bottleneck client-side layers and (2) a width of the bottleneck. This can also be described as a two-dimensional parameter surface. In FIG. 3A, for example, a first example ANN 300 is illustrated that can be used when network connection speed/bandwidth is high/good (e.g., above a threshold). In some implementations, this ANN 300 may be used regardless of the processing capabilities of the client computing device 104 (i.e., because the network connection is so good). The processing task is divided into a small number of client-side layers 304 and a large number of server-side layers 308, with a bottleneck layer 312 therebetween. The client-side layers 304 executed at the client computing device 104 can begin with the receipt of the input 316 and end with the bottleneck layer 312, which can cause transmission of the activations to the server computing device 112. A layer height indicator 320 is indicative of the small number of client-side layers 304 and a bottleneck width indicator 324 is indicative of the wide bottleneck, which corresponds to the high quality network connection.

In FIG. 3B, another example ANN 330 is illustrated. Again, the processing task is divided into client-side layers 334 and server-side layers 338 that are divided by a bottleneck layer 342. This ANN 330 can be utilized, for example, when the network condition speed/bandwidth is low/poor (e.g., below the threshold) and the processing capabilities of the client computing device 104 are also low/poor (e.g., below a threshold). The low-quality network connection is indicated by a narrower bottleneck width indicator 346 compared to FIG. 3A. While the client computing device 104 executes, in response to an input 350, more client-side layers 334 (as indicated by a layer height indicator 354) compared to FIG. 3A, there are still a relatively large number of server-side layers 338 due to the limited processing capabilities of the client computing device 104. In contrast to FIG. 3B, FIG. 3C illustrates another example ANN 360 with a low-quality network connection (indicated by a bottleneck width indicator 364), but the client computing device 104 has much greater processing capabilities (e.g., greater than the threshold). Thus, in response to an input 368, the client computing device 104 can execute a much larger number of client-side layers 372 (as indicated by a layer height indicator 376) compared to FIGS. 3A and 3B. Thus, after a bottleneck layer 380, the server computing device 112 only executes a small number of server-side layers 384.

After obtaining the selected ANN, the client and server computing devices 104, 112 can coordinate processing of the processing task according to the selected ANN. This can include, for example, a level/type of compression to be applied to any data transmitted via the network 116. While client processing capabilities and network quality are the focus of the above, the selection of the ANN can be further based on other factors as previously described herein. In a limited battery scenario, for example, the selection can balance the energy cost (battery charge) of network traffic with the energy cost of additional client-side computations. Similarly, if an automatic detection can be made that the client computing device 104 is roaming or paying a high data cost, the selection of the ANN can be further biased towards small bottleneck architectures.

For most processing tasks, the client computing device 104 can select the selected ANN and can perform a first portion (e.g., a first number of layers) of the processing task to obtain intermediate processing results. The client computing device 104 can then communicate with the server computing device 112 via the network 116 (e.g., by transmitting the activations, such as the intermediate processing results and additional information for completing the processing task, such as a unique identifier (ID) of the selected ANN), which can cause the server computing device 112 to perform a second portion (e.g., a remainder of the layers) of the processing task to obtain final processing results, which are then returned to the client computing device 104 for generating an output. In order to allow for continuous improvement of all layers of the stack defined by a particular ANN, logging of a sample of the inputs or all of the raw initial data (i.e., before compression) can be performed, such as for cases where the network 116 is limiting. This asynchronous logging in such scenarios then allows for subsequent improvement once the condition of the network 116 has improved.

For some processing tasks (e.g., text-to-speech conversion), however, the server computing device 112 can select the selected ANN, perform the first portion of the processing task to obtain the intermediate processing results, and transmit the activations (e.g., the intermediate processing results and additional information for completing the processing task) to the client computing device 104. The client computing device 104 can then perform the second portion of the processing task to obtain the final processing results. In other words, the process for certain processing tasks (e.g., text-to-speech conversion) can be thought of as the reverse of the process for other processing tasks. The client computing device 104 can generate an output based on the final processing results.

Non-limiting examples of the output generated by the client computing device 104 can include a text, an image, and a sound. This output can be generated using the various components of the client computing device 104 (the input/output device 216, such as a touch display, the speaker, etc.). For example, when the processing task is speech-to-text, the output can be a text that is representative of the original digital media item (an audio or video file). As another example, when the processing task is image or text recognition, the output can be a text or another image that is representative of the original digital media item (an image or video file). As yet another example, when the processing task is text-to-speech conversion, the output can be a sound or audio stream that is representative of the original digital media item (a string of text or a text file). It will be appreciated that other possible outputs could also be generated for the same or similar recognition processing tasks, such as music/song recognition.

Referring now to FIG. 4, a flow diagram of an example adaptive ANN selection technique 400 is illustrated. At 404, the client computing device 104 can obtain a digital media item (a string of text or a text file, an audio file, an image file, a video file, etc.) and a request for a processing task on the digital item. At 408, the client computing device 104 can determine a set of operating parameters that affect a desired distribution of the processing task. At 412, the client computing device 104 can determine whether the processing task is text-to-speech ("TTS") conversion or another similar processing task that involves the server computing device 112 selecting the ANN. If the task is not text-to-speech conversion, the technique 400 can proceed to 416. If the task is text-to-speech conversion, however, the technique 400 can proceed to 432.

At 416, the client computing device 104 can select one of the plurality of ANNs based on the set of operating parameters. At 420, the client computing device 104 can perform a first portion of the processing task (e.g., up to and including a bottleneck layer) as specified by the selected ANN to obtain intermediate processing results. At 424, the client computing device 104 can transmit activations (e.g., the intermediate processing results and additional information for completing the processing task) to the server computing device 112. Receipt of the activations can cause the server computing device 112 to complete a second portion of the processing task as specified by the selected ANN and using the received activations to obtain final processing results. At 428, the client computing device 104 can receive final processing results from the server computing device 112. The technique 400 can then proceed to 444.

At 432, the client computing device 104 can transmit the set of operating parameters (and potentially other information) to the server computing device 112. Receipt of the set of operating parameters can cause the server computing device 112 to (i) select one of the plurality of ANNs, (ii) perform a first portion of the text-to-speech conversion (e.g., up to and including a bottleneck layer) as specified by the selected ANN to obtain intermediate processing results, and (iii) transmit activations (e.g., the intermediate processing results and additional information for completing the processing task) to the client computing device 104. The intermediate processing results can be received by the client computing device 104 at 436. At 440, the client computing device 104 completes a second portion (i.e., a remainder) of the processing task as specified by the selected ANN and using the received activations to obtain final processing results. At 444, the client computing device 104 can generate an output (text, an audio stream, an image, etc.) based on the final processing results. The technique 400 can then end or return to 404.

Further to the descriptions above, a user may be provided with controls allowing the user to make an election as to both if and when systems, programs or features described herein may enable collection of user information (information about a user's current location, information about a user's cellular billing plan, etc.), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method comprising:
    obtaining, by a client computing device having one or more processors, a digital media item and a request for a processing task on the digital item;
    determining, by the client computing device, a set of operating parameters based on (i) available computing resources at the client computing device and (ii) a condition of a network, wherein the client computing device and a server computing device are configured for communication with each other via the network;
    based on the set of operating parameters, selecting, by the client computing device, one of a plurality of artificial neural networks (ANNs) stored at the client computing device, each of the plurality of ANNs configured to perform distributed processing of the same processing task across the client computing device and the server computing device and defining:
        a different respective first number of layers executable by the client computing device to perform a different respective first portion of the processing task to obtain respective intermediate processing results that are different than the respective intermediate processing results that the other ANNs of the plurality of ANNs are configured to obtain; and
        a different respective second number of layers executable by the server computing device to perform a different respective remaining second portion of the processing task;
    performing, by the client computing device, the respective first portion of the processing task by executing the respective first number of layers defined by the selected ANN to obtain the respective intermediate processing results;
    transmitting, by the client computing device and to the server computing device:
        the respective intermediate processing results obtained by executing the respective first number of layers defined by the selected ANN; and
        data indicating which one of the plurality of ANNs was selected by the client computing device;
    obtaining, by the client computing device, final processing results from the server computing device, the final processing results generated by the server computing device performing the respective remaining second portion of the processing task by executing the respective second number of layers defined by the ANN selected by the client computing device using the respective intermediate processing results transmitted by the client computing device; and
    generating, by the client computing device, an output based on the final processing results.

2. The computer-implemented method of claim 1, wherein the available computing resources at the client computing device includes at least one of (i) a level of charge of a battery of the client computing device, or (ii) a level of processing power of the client computing device.

3. The computer-implemented method of claim 1, wherein the available computing resources at the client computing device includes both (i) a level of charge of a battery of the client computing device, and (ii) a level of processing power of the client computing device.

4. The computer-implemented method of claim 1, wherein the digital media item is an audio file or a video file, and wherein the processing task is speech recognition or speech-to-text synthesis.

5. The computer-implemented method of claim 1, wherein the digital media item is an image file or a video file, and wherein the processing task is image recognition or text recognition.

6. The computer-implemented method of claim 1, wherein the digital media item is a string of text or a text file, and wherein the processing task is text-to-speech synthesis.

7. The computer-implemented method of claim 1, wherein the intermediate processing results comprise data indicating a set of activations of a layer of the selected ANN.

8. The computer-implemented method of claim 1, wherein the selected ANN comprises a trained neural network comprising the first number of layers executable by the client computing device and the second number of layers executable by the server computing device wherein the trained neural network is trained such that output of the first number of layers is provided as input to the second number of layers to perform the processing task.

9. The computer-implemented method of claim 8, wherein the first number of layers comprise a bottleneck layer having a number of values that is less than an input layer of the first number of layers, and wherein the intermediate results comprise data generated by the bottleneck layer.

10. The computer-implemented method of claim 1, wherein each of the plurality of ANNs is a first subset of the layers of a different neural network machine learning model, the different neural network machine learning models each comprising a first subset of layers and a second subset of layers, wherein each neural network machine learning model is separately trained.

11. The computer-implemented method of claim 1, wherein the different respective first portion of the processing task performed by each of the plurality of ANNs stored at the client computing device involves a respective different amount of computation by the client computing device when executing the different respective first number of layers.

12. A computing system including one or more processors and one or more non-transitory memory devices having a set of instructions stored thereon that, when executed by the one or more processors, causes the computing system to perform operations comprising:
    obtaining, by a client computing device, a digital media item and a request for a processing task on the digital item;
    determining, by the client computing device, a set of operating parameters based on (i) available computing resources at the client computing device and (ii) a condition of a network, wherein the client computing device and a server computing device are configured for communication with each other via the network;
    based on the set of operating parameters, selecting, by the client computing device, one of a plurality of artificial neural networks (ANNs) stored at the client computing device, each of the plurality of ANNs configured to perform distributed processing of the same processing task across the client computing device and the server computing device and defining:
        a different respective first number of layers executable by the client computing device to perform a different respective first portion of the processing task to obtain respective intermediate processing results that are different than the respective intermediate processing results that the other ANNs of the plurality of ANNs are configured to obtain; and a different respective second number of layers executable by the server computing device to perform a different respective remaining second portion of the processing task;

performing, by the client computing device, the first portion of the processing task by executing the respective first number of layers defined by the selected ANN to obtain the respective intermediate processing results;

transmitting, by the client computing device and to the server computing device:

the respective intermediate processing results obtained by executing the respective first number of layers defined by the selected ANN; and data indicating which one of the plurality of ANNs was selected by the client computing device;

obtaining, by the client computing device, final processing results from the server computing device, the final processing results generated by the server computing device performing the respective remaining second portion of the processing task by executing the respective second number of layers defined by the ANN selected by the client computing device using the respective intermediate processing results transmitted by the client computing device; and generating, by the client computing device, an output based on the final processing results.

13. The computing system of claim 12, wherein the available computing resources at the client computing device includes at least one of (i) a level of charge of a battery of the client computing device, or (ii) a level of processing power of the client computing device.

14. The computing system of claim 12, wherein the available computing resources at the client computing device includes both (i) a level of charge of a battery of the client computing device, and (ii) a level of processing power of the client computing device.

15. The computing system of claim 12, wherein the digital media item is an audio file or a video file, and wherein the processing task is speech recognition.

16. The computing system of claim 12, wherein the digital media item is an image file or a video file, and wherein the processing task is image recognition or text recognition.

17. The computing system of claim 12, wherein the digital media item is a string of text or a text file, and wherein the processing task is text-to-speech synthesis.

18. The computing system of claim 12, wherein the operations further comprise:

obtaining, by the client computing device, a second digital media item and a second request for a second processing task on the second digital item;

determining, by the client computing device, a second set of operating parameters based on (i) available computing resources at the client computing device and (ii) a condition of a network;

transmitting, from the client computing device and to the server computing device, the second set of operating parameters, wherein receipt of the second set of operating parameters causes the server computing device to (i) select a second selected ANN and (ii) perform a first portion of the second processing task to obtain second intermediate processing results;

receiving, by the client computing device and from the server computing device via the network, the second intermediate processing results;

obtaining, by the client computing device and based on the second intermediate processing results from the server computing device, second final processing results corresponding a final evaluation of the second processing task; and generating, by the client computing device, an output based on the second final processing results.

19. The computing system of claim 18, wherein the client computing device performs a second portion of the second processing task using the second intermediate processing results to obtain the second final processing results.

\* \* \* \* \*